United States Patent
Okada

Patent Number: 5,477,457
Date of Patent: Dec. 19, 1995

[54] CRUISE CONTROL SYSTEM FOR MOTORCARS

[76] Inventor: Motohiro Okada, 26-17, Negishidai 7-chome, Asaka-shi, Saitama-ken, Japan

[21] Appl. No.: 180,061

[22] Filed: Jan. 11, 1994

[30] Foreign Application Priority Data

Jan. 12, 1993 [JP] Japan ................................. 5-033891

[51] Int. Cl.⁶ .......................... B60K 31/02; G05D 13/00
[52] U.S. Cl. ...................... 364/426.04; 364/565; 180/170
[58] Field of Search ........................... 364/426.04, 461, 364/565, 561, 424.05, 162, 424.02; 123/349; 180/170, 178, 179; 340/903

[56] References Cited

U.S. PATENT DOCUMENTS

| | | | |
|---|---|---|---|
| 4,577,718 | 3/1986 | Ueno | 180/179 |
| 5,005,133 | 2/1991 | Takanhashi | 364/426.04 |
| 5,014,200 | 5/1991 | Chundrlik et al. | 364/426.04 |
| 5,053,979 | 10/1991 | Etoh | 364/565 |
| 5,173,859 | 12/1992 | Deering | 364/426.01 |
| 5,189,619 | 2/1993 | Adachi et al. | 364/426.04 |
| 5,197,562 | 3/1993 | Kakinami et al. | 180/169 |

Primary Examiner—Michael Zanelli
Attorney, Agent, or Firm—Young & Thompson

[57] ABSTRACT

A cruise control system for keeping substantially constant distance to a preceding motorcar by a position servo unit which controls a fuel supply of a car, including a pacemaker which produces a difference between an imaginary pace value which is proportional to the car velocity at an instance when a driver judges that a stable constant distance to the preceding car is attained and an actual pace value, the difference being fed to the position servo unit which functions to reduce the difference to keep a constant set distance value to the car in front. The invention modifies the difference directly or indirectly when the driver judges that the velocity of his car deviates from the set distance value which has been set previously.

6 Claims, 3 Drawing Sheets

CRUISE CONTROL SYSTEM FOR MOTORCARS

BACKGROUND OF THE INVENTION

1. Field of the Invention

The present invention relates to a novel cruise control system for motorcars, in particular to a cruise control system which can be advantageously used to follow a preceding car on highways.

The cruise control system according to the present invention is so simple that is easily operable by any driver without any feeling of disorder or inconvenience and improves fuel economy.

2. Description of the Related Art

A variety cruise control systems are known and are equipped in actual motorcars. All known cruise control systems, however, are designed for a leading car which cruises at the head of a group of cars going in the same direction at a constant velocity at driver's pace, but are not designed for a car which follows other cars. In other words, conventional cruise control systems are not convenient for a "following driving mode".

In conventional cruise control systems, when a driver of a following car intends to follow a preceding car, firstly he must drive his car so as to keep a constant distance from the preceding car and then, when the driver judges that the velocity of his car is equal to that of the preceding car, he pushes a setting button of the cruise control system to start the cruise control system. However, he is usually soon requested to readjust or correct the cruise control system, because the distance to the preceding car estimated might not be correct and will drift or go out of a target distance. In this case, driver must simultaneously perform two corrections or readjustments of (1) the distance to the preceding car and (2) fine correction of the car velocity.

The correction or readjustment of known cruise control systems, however, is very complicated or sophisticated and is not easy. In fact, when the distance to the preceding car becomes shorter, firstly the driver must disengage the cruise control system to put the accelerator pedal back, so that the car slows down and then, when he judges that a proper distance to the preceding car is recovered, he pushes a restoring button so as to return to the velocity value previously set. In this case, however, the cruise control system commands the accelerator to open to its full potential because the car's velocity has slowed down below the set velocity beyond the ordinary control range, resulting in that automatic transmission is kicked down to carry out a sudden acceleration. After this acceleration is complete and the car returns to a stable velocity, the driver is requested to cancel the cruise control system once then to decelerate a little before he resets the cruise control system again. The conventional cruise control system requires such complicated controlling procedure of drivers. Still further, the above-mentioned small deceleration must be effected by driver's own perception, since the speed meter does not have such a high resolution that can measure such a small decrease in velocity. This necessitates readjustment often. If a driver who hates such complicated procedure cancels the cruise control system abruptly to increase the distance to the preceding car, the set value input previously is lost or disappears and hence the driver can't utilize it, resulting in that precision in velocity is returned to the starting point.

In an opposite case wherein the distance to the preceding car becomes longer than a target value, the accelerator pedal is depressed to recover the target distance to the preceding car. Then, when the accelerator pedal is released, deceleration starts because the cruise control system commands the accelerator to stop accelerating in this case. So, after the cruise control system returns to its balanced condition, the driver pushes an incremental button to gradually increase the target velocity value.

The above-mentioned complicated procedures may be possible theoretically but are not realistic, so conventional cruise control systems are not convenient for drivers and are not used in actual driving. Impracticability of the conventional cruise control system come mainly from following two reasons.

Firstly, frequent correction of adjustment is not expected in the cruise control system. In other words, in "following driving mode", a following car controlled by the cruise control system must run at least more than several ten times longer time duration than manual driving in which a driver can adjust continuously the car velocity. This means that a driver needs to input a velocity value to the cruise control system with such extremely high precision in velocity that is more than one several tenth more sensitive than manual driving. Human beings do not possess such high resolution in velocity. Such fine control can be realized only by a computer having a special program to follow a preceding car.

Secondly, in the conventional cruise control system which is based on the velocity control theory, an operational factor which a driver can input to the system is a single velocity value. In other words, the conventional cruise control system is designed mainly for leading cars but not for following car or tailing cars. Therefore, the conventional cruise control system can not be used conveniently in the "following driving mode". It is not easy to realize such a control system that can control or adjust both the distance to a car in front and the velocity simultaneously, because these two factors are related to each other and must be operated sequentially and automatically by a single input signal.

The distance to the preceding car can be measured directly by using a radar or other sensors. Automatic cruise control systems using such measuring means are expected theoretically but it is not realistic at the present level of technology for many reasons.

The conventional cruise control system has other demerits also. Firstly, in the conventional cruise control system based on the velocity control, deviation or drift in velocity from a set value caused by change in resistance to which the car is subjected can be recovered automatically but the time elapsed can never be recovered. In other words, accumulation of time duration for compensating such time elapsed caused by errors in the velocity result in a delay in the arrival time at the destination. Secondly, in a car equipped with the conventional cruise control system, it is often observed that a driver operates an acceleration pedal much more frequently than in manual driving, because the above-mentioned inconvenience of the known system. This means that the car wastes fuel and, in the case of a car equipped with a torque convertor, unnecessary "kick-down" occurs on up-hill roads where the top gear can be used in the case of manual driving mode, resulting in bad ride. Finally, frequent changes of the gear ratio up and down are often observed in the neighborhood of a gear shifting point, when a car equipped with a torque convertor runs on up-hill roads. Such shift can be prevented by modifying the velocity in the case of manual driving. However, since the conventional cruise control system is not convenient in such situation, the driver gives it up and resets the system.

In conclusion, the conventional cruise control system has been considered to be one of non-useful decoration for high-class motorcars but has been forgotten by popular cars or business cars in Japan.

Therefore, an object of the present invention is to provide a novel cruise control system for motorcars which can be used advantageously in following driving mode and of course in leading driving mode also, which permits to follow to a preceding car easily, stably and safely and which can reduce driver's load and increase economy of fuel.

SUMMARY OF THE INVENTION

The present invention provides a cruise control system for keeping a substantially constant distance to a preceding motorcar by a position servo unit which controls a fuel supply mans of the car, including a pacemaker which produces a difference "D" between an imaginary pace value "C" which is proportional to the car velocity at an instant when a driver judges that a stable constant distance to the preceding car is attained and an actual pace value "S", the difference "D" being fed to the position servo unit which functions to reduce the difference "D" to keep a constant set distance value to the car in front, characterized by a means for modifying the difference "D" directly or indirectly when the driver judges that the velocity of his own car deviates from the set distance value which has been set previously.

Preferably, the means for modifying the difference "D" is a reversible incremental cruise control dial arranged on a steering wheel for adding an additional pace value "A" to the difference "D" directly or indirectly when the reversible incremental cruise control dial is operated. Of course, this control dial can be any other mechanism which produces incremental data reversibly.

The means for modifying the difference "D" contains preferably, as one of operation parameters, a function of past cruising data. The cruise control system includes preferably a means for giving a weight to an operational factor of the pacemaker, when the cruise control dial is actuated under a premature condition.

The imaginary pace value "C" and the actual pace value "S" can be produced from a pulser whose output pulses are proportional to the velocity of own car. The imaginary pace value "C" and the actual pace value "S" can be produced from pulses produced in the pulser.

The imaginary pace value "C" can be a product of an initial coefficient value "Ka" which is proportional to the velocity of the car at the instant when the driver judges that a stable constant distance to the preceding car is attained and a time duration "T" elapsed after the instance, and is compared with the actual pace value "S" in an adder-subtracter which outputs the difference "D".

In the cruise control system according to the present invention, the initial coefficient value "Ka" is replaced by a corrected new coefficient "Ka" which is calculated by adding the additional pace value "A" which is produced by the reversible incremental cruise control dial when the driver judges that the velocity of his own car deviates from the set velocity value which has been set previously.

The cruise control system may include additionally a means for changing the pulse rate in the pacemaker according to a predetermined function when the cruise control dial is prematurely operated.

The position servo unit can be a digital or analog proportional-integral-derivative (P.I.D.) controller.

The actual pace value "S" can be real distance value produced in an integration register to which the pulses produced in the pulser are input.

The cruise control system according to the present invention can be defined differently as a cruise control system for keeping substantially constant distance to a preceding motorcar by a position servo unit which controls a fuel supply mean of a car, comprising a pacemaker for producing command pulses to the position servo unit, a means for supplying distance pulses which are proportional to mileage of the car, as feedback pulses, to the position servo unit, an initial value setting means for setting an initial pulse rate for the pacemaker at an instance when a driver judges that a stable constant distance to the preceding car is attained, and a control means for modifying the remaining pulses of the pacemaker directly or indirectly at another instance when the driver judges that the distance to the preceding car deviates from the stable constant distance set in previous operation.

The cruise control system according to the present invention is based on the principle that it is desirable to keep a constant distance between successive two cars during the stable driving condition particularly on highways.

The cruise control system according to the present invention necessitates intermittent manual adjustment or correction operation. This manual adjustment or correction operation, however, is a very simple correction which any driver can perform with no feeling of inconvenience because the adjustment or correction is effected only by inputting a value corresponding to a distance to the preceding car which all drivers can recognize very easily and which is incremental and proportional or linear.

In a preferred embodiment of the cruise control system according to the present invention, a driver drives his car to follow a preceding car and then pushes a setting button at an instance when he judges that a distance to the preceding car becomes a stable or constant value so as to start the cruise control system. By this driver's action, a pacemaker memorizes a pulse rate corresponding to that instant and continues to produce the same pulse rate. This pulse rate is used as an imaginary pacemaker value and is compared with actual pulses obtained from a wheel in a comparator to produce remaining pulses or a difference therebetween. The remaining pulse is fed to a known servo-control unit such as P.I.D. servo-controller which control a digital step motor, so that a fuel supply system such as an accelerator pedal of a car is servocontrolled. The P.I.D. controller can be replaced totally or partly by a fuzzy logic matrix or a look-up table or the like.

Then, when the driver is aware of apparent deviation in the distance to the preceding car from the value previously set, he manually actuates or operates a reversible incremental encoder to produce proportional pulses which are counted in a reversible counter. An output of the reversible counter is added to the remaining pulses so as to readjust the distance.

At the same time, the pulse rate of the pacemaker also is modified to a value corresponding to a quotient obtained by dividing the corrected value of distance obtained by a mileage run. In other words, the distance to the preceding car is considered to be deviated, in average, from the previously adjusted value and hence a new imaginary pacemaker value is used thereafter.

The cruise control system can request to change the gear shifting point when frequent gear shift occur in an automatic transmission. On the other hand, the automatic transmission can select a constant which gives reduced gear shift shock during the cruise control system is used.

The cruise control system according to the present invention is operated as follows:

At an instant when a driver of a following car judges that a distance to a preceding car becomes a stable or constant value, he pushes a setting button so as to start a pacemaker, so that the wheel pulses corresponding to a car speed at the instance is memorized in a register, as an initial pulse rate "Ka", in the pacemaker. A pace calculator produces an imaginary pacemaker value "C" which is a product of "K" and time elapsed "T" after the above-mentioned instant. This imaginary pacemaker value "C" is compared with a real value "S" in an adder-subtracter. The resulting difference or remaining pulses is fed to a P.I.D. controller through a D/A converter, so that an accelerator pedal is servo-controlled through a step motor.

When the distance between two successive cars deviates from the initial setting value, the driver actuates a main cruise control dial so as to recover the constant distance. This action produces incremental pulses "A" which are fed to the adder-subtracter in which the value "A" is added to the value "D" so that the P.I.D. controller now functions based on this modified difference "D", resulting in that the accelerator pedal is actuated so as to change the distance to the preceding car.

Now, the present invention will be described with reference to attached drawings.

DESCRIPTION OF THE PREFERRED EMBODIMENTS

Figure 1:
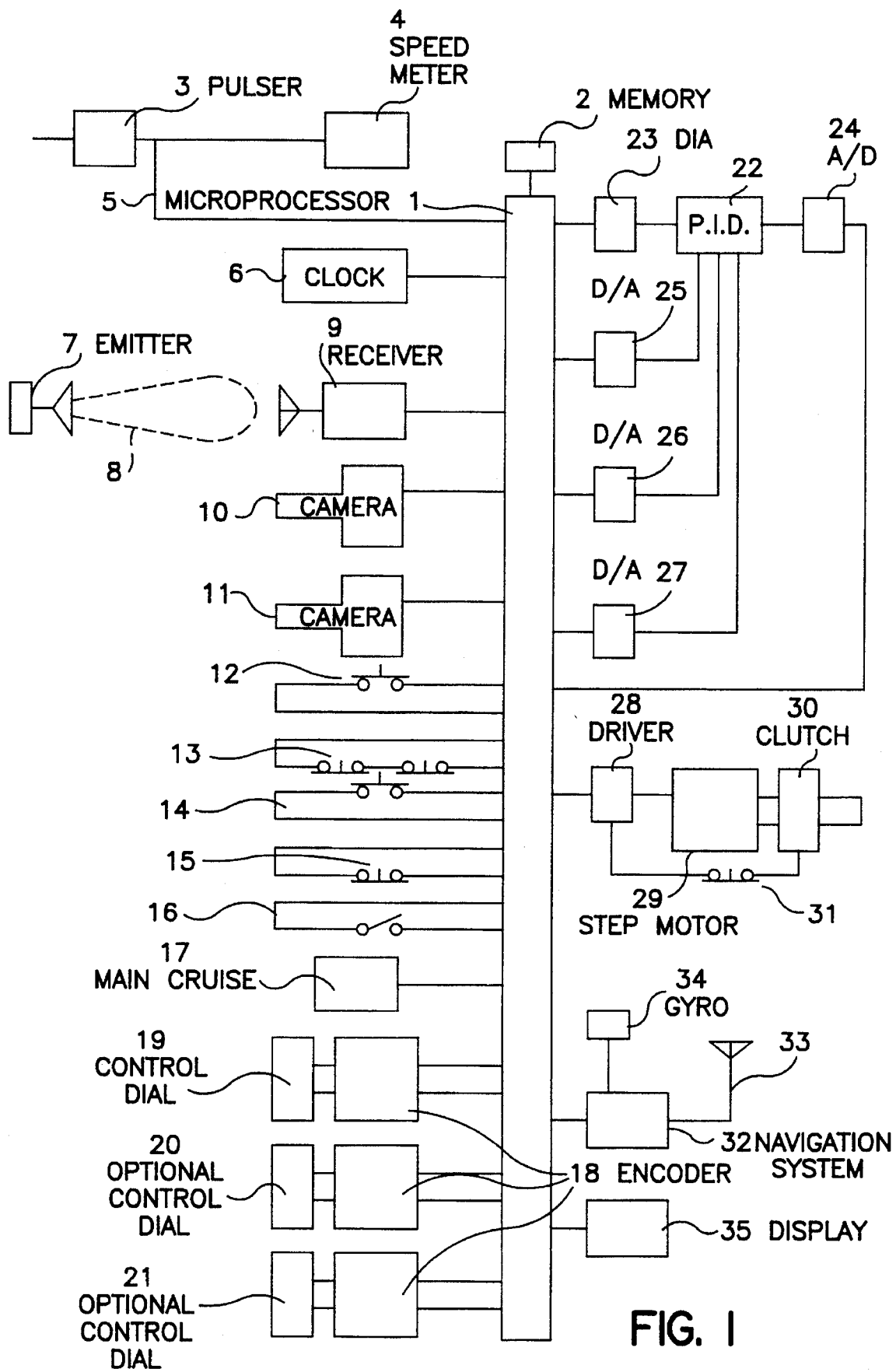
FIG. 1 is an illustrative block diagram of a computer control system in which the cruise control system according to the present invention is included.

FIG. 1 is a block diagram of a computer control system which depicts the cruise control system according to the present invention.

The velocity of a car in which the control system is used is detected by a pulser 3 which is connected to, for example, one of the non-driven wheels of the car produce pulses 5 which are proportional to the velocity of the car (hereinafter, "wheel pulses"). The wheel pulses 5 are fed to a speed meter 4 so as to display the car speed and also to a computer or microprocessor 1.

The following parts and accessaries are connected to the computer or microprocessor 1:

1) a non volatile memory 2 for storing data concerning driving in past,
3) a clock 6 driven by a quartz oscillator, for example,
4) a setting button 12 to start the cruise system,
5) a switching button 13 to return to the manual operation, arranged in parallel with another switching button which is actuated by a brake pedal,
6) a restoring button 14 for returning to the cruising operation,
7) a cancel button 15 for canceling the cruising operation and for clearing an integrated number in a pacemaker 100 (which will be described later) to zero,
8) a reversible incremental encoder 18 which is connected to a main cruise control dial 19 according to the present invention, the dial 19 being a dial for inputting a correction value of the distance to the preceding car as well as for adjusting the velocity finely.
9) optional control dials 20 and 21 for adjusting the distance to the preceding vehicle and the car speed respectively and independently or separately,
10) analog or digital proportional integral derivative (P.I.D.) controller 22 connected to the computer 1 through D/A converter 23 and A/D converter 24. Gains of the three elements of P (proportional), I (integral) and D (derivative) of the P.I.D. controller 22 can be adjustable by respective D/A convertors 25, 26 and 27 which may be operable from the computer 1. An example of commercially available typical P.I.D. servo-controllers is MER-SAVO-SA (Mitsubishi Electric Corporation, Tokyo, Japan). During the transition period, and imaginary target may be input form the computer 1 to the D/A converter 23 so as to improve the feeling and fuel economy by using four degrees of freedom of this input and the gain.
11) a step motor 29 connected to the computer 1 through its driver 28 for actuating a fuel control system such as an accelerator pedal of an own car (not shown) through a clutch 30. When the electronics system breaks down, an emergency release button 31 is actuated to disengage the clutch 30. The emergency release button 31 may actuates the other units such as a brake.

The following optional accessaries which are not used directly in the present cruise control system can be connected to the computer or microprocessor 1:

an interface to an automatic transmission unit 17, through which proper gear shifting is requested from the cruise control system and data concerning gear ratio, engine revolution data number of an engine or the other data which are necessary to drive the car with improved feeling, a receiver 9 for receiving a beam 8 from emitters 7 positioned along a highway to produce ground markers, charge coupled device (CCD) cameras 10, 11 attached at opposite front sides of a car for measuring a distance to the preceding car and may be optionally used to control the distance to the preceding car in the present invention, a car navigation system 32 having a gyrocompass 34 and a satellite antenna 33 and connected to a display 35.

Figure 2:
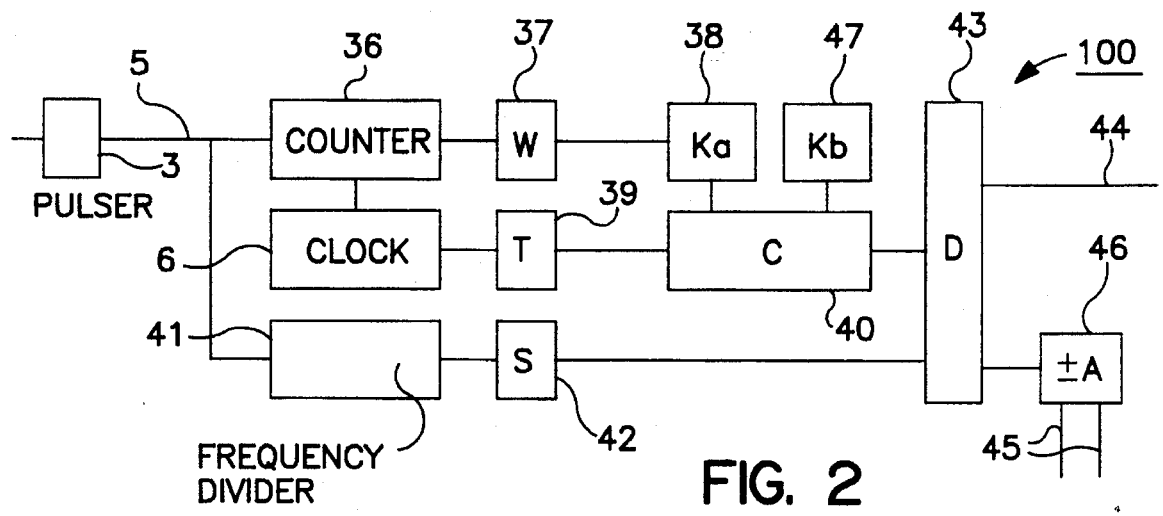
FIG. 2 is a block diagram of a pacemaker which can be realized by a part of the computer system shown in FIG. 1.

FIG. 2 is a block diagram of a pacemaker 100 which can be realized by the computer or microprocessor 1 shown in FIG. 1.

The pacemaker 100 receives the wheel pulse 5 from the pulser 3. A shaft of the pulser 3 revolves, for example 637 times per kilometer and produces 32 pulses per revolution (and hence 20,384 pulses per kilometer).

Before the cruise control system is started, the wheel pulses 5 are counted in a counter 36 which opens for one second ("one second gate counter") and are stored in a register 37 in the computer 1 (pulse number of "W"). A number which is obtained by dividing the number "W" by 8 is fed to register 38 and 47 as their initial coefficients "Ka" and "Kb".

When the setting button 12 is pushed, connection between registers 37 and 38 is cut that the initial values "Ka" and "Kb" are fixed thereafter. A time duration "T" (second) after this setting is stored in a register 39, and a product of "Ka" and "T" is calculated in a pace calculator 40 and is stored as an imaginary pace value "C" which is fed to an adder-subtracter 43. The wheel pulses 5 are fed also to a frequency divider 41 in which the wheel pulses 5 are divided by 8 and cumulated in an integration register 42 to produce a real distance value or actual pace value "S". This value "S" is fed to the adder-subtracter 43 in which two values of "C" and "S" are compared and a difference "D" therebetween is calculated. The value "D" is called "remaining pulses" 44 and is fed to the P.I.D. controller 22 through the D/A converter 23. An output fed through the A/D converter 24 of the P.I.D. controller 22 is used to servo-control the step motor 29 for the fuel system. The P.I.D. controller 22 is connected to a reversible counter 46 (whose function will be explained later) which is connected to the double action incremental encoder 18 connected to the main cruise control dial 19.

The cruise control system according to the present invention is based on the supposition that it is preferable to keep a constant distance between successive two cars during stable driving conditions on highways and hence is advantageously used for long distance driving.

In operation, when a distance to a preceding car becomes stable or constant, a driver of a following car pushes the setting button 12 so that the pacemaker shown in FIG. 2 is started, so that the wheel pulses 5 corresponding to a car speed at the instance is memorized in the register 38 as an initial coefficient "Ka" (=W/8). The pace calculator 40 calculates the product "C" (=Ka×T) which is used as an imaginary pacemaker value. This product "C" is compared with a real value "S" in the adder-subtracter 43. The resulting difference "D" or remaining pulses 44 is fed to the P.I.D. controller 22 through the D/A converter 23, so that the accelerator pedal is servo controlled through the step motor 29 for example. The P.I.D. controller 22 can be replaced totally or partly by a fuzzy logic matrix or a look-up table or the like.

Now, the use of the cruise control system will be explained referring to FIG. 3 in which the abscissa 49 represents time duration and the ordinate 50 represents the travelling distance.

Figure 3:
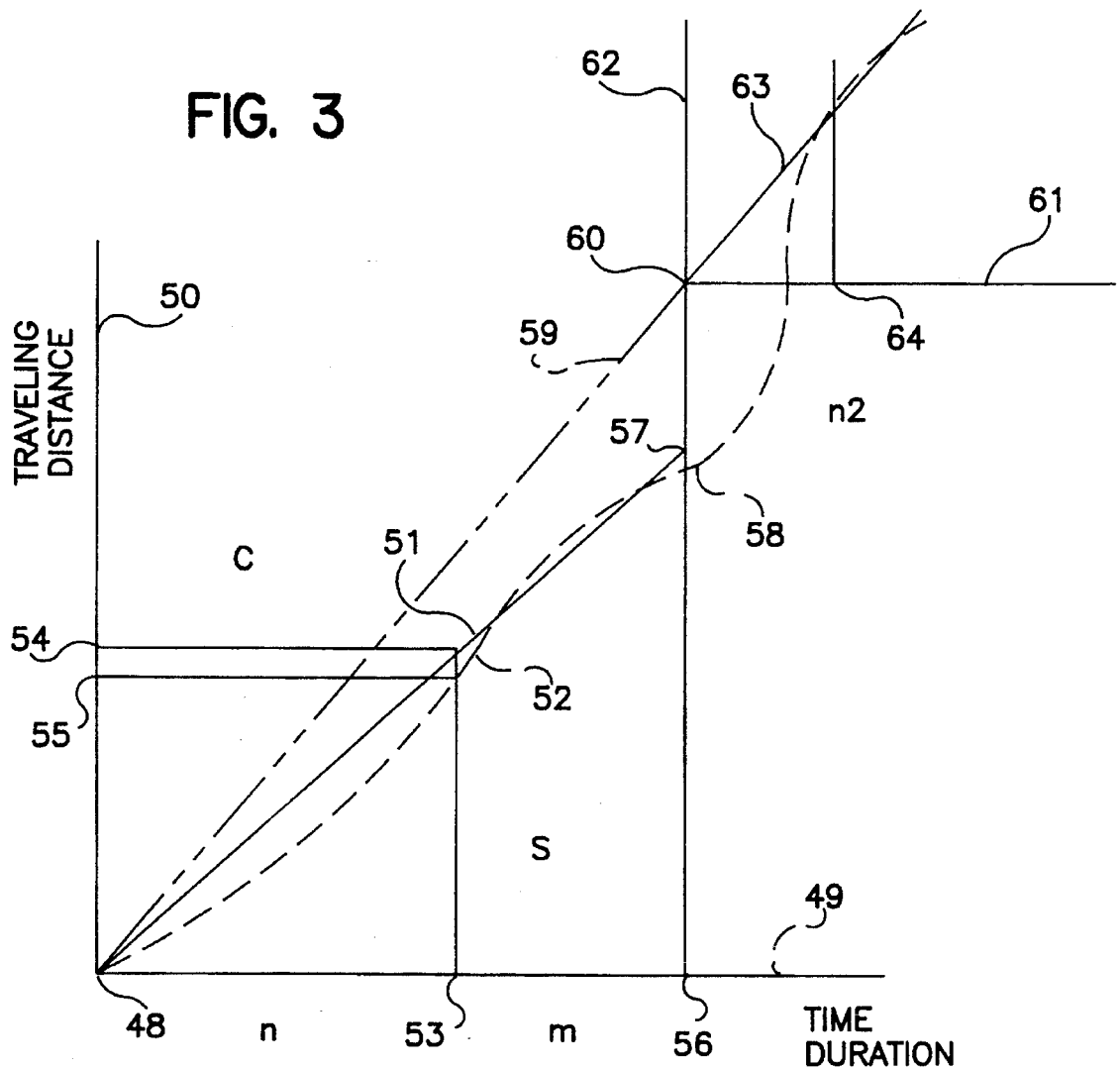
FIG. 3 is an illustrative time histogram for explaining how the pacemaker functions.

Supposing that a driver pushes the setting button 12 at an instance when a distance to a preceding car becomes a constant value, this instant is represented by the origin 48 in FIG. 3. In FIG. 3, a two-dot chain line 59 represents a locus through which the preceding car actually traveled, a solid line 51 corresponds to the pacemaker value "C" (=Ka×T), and a chain line 52 corresponds to the real distance value "S" of own car. Skilled persons can easily understand that a deviation between the calculated value 54 and the real value 55 after a time duration "n" at 53 from the origin 48 corresponds to the remaining pulses 44 or the difference "D" and that the accelerator pedal, for example, is servo-controlled by the step motor 29 which is controlled by the P.I.D. controller 22 so as to reduce the difference "D".

FIG. 3 illustrates the case in which the driver recognized, at a time 56 which was "m" seconds after the origin 48, that the velocity 59 of the preceding car was faster than an estimated velocity 51 which had been set by the driver at the origin 48. In fact, the distance between two cars increased to a value corresponding to a difference between 60 and 58 in FIG. 3. Therefore, the driver tried to recover the constant distance to the car in front by adjusting the main cruise control dial 19 to a direction which recover the delay. In other words, adjustment of the main cruise control dial 19 produces incremental pulses "A", as an additional pace value, which were fed to the reversible counter 46 through the incremental encoder 18. In the embodiment shown, the incremental pulses "A" counted in the reversible counter 46 were fed to the adder-subtracter 43 in which the value "A" was added to the value "D". At the same time, a quotient value (A/m) obtained by dividing the value "A" by "m" (second) was fed to the register 38 so that the initial coefficient value "Ka" was replaced by the quotient value (A/m) as a new coefficient "Ka" and the contents of registers 39 (T) and 42 (S) were returned to zero so that the new coefficient "Ka" was used in calculation of the value "C" in the pace calculator 40 thereafter. Namely, in FIG. 3, the second origin 60 shows an instance when the main cruise control dial 19 was actuated, the second abscissa 61 represents the time duration after the second origin 60 and the second ordinate 62 represents a distance from the second origin 60. A line 63 which is an extension of the two-dot chain line 59 is a new locus of the preceding car. At this stage, a deviation of the real value 58 from the second origin 60 corresponded to the remaining pulses "D", so that the P.I.D. controller 22 functions to reduce the difference "D" or remaining pulses 44, resulting in that the accelerator pedal was actuated to accelerate the car. After "n2" seconds from the second origin 60, the car caught up to the preceding car. The value of "Kb" is fixed until the setting button 12 and/or the cancel button 15 are not pushed again and is used when the limit of the value "Ka" is calculated or the like.

In a variation, the output of the reversible counter 46 may be input to the pace calculator 40 (C) or to the integration register 42 (S) or used to change the pulse rate of the pulser 3 temporally, so that the difference "D" is modified indirectly.

Then, the car can run without further adjustment for a considerably long distance. And, even if re-adjustment become necessary due to an error of estimation in distance to the car in front or change in velocity of the preceding car, the adjustment can be done very easily as described above. Still further, in the servo-control according the present invention, control is effected to such a direction that difference in distance from the preceding car is converged gradually and hence the degree of adjustment reduces gradually so that the car can run for a long distance without further manual adjustment. Cruise becomes more stable if the preceding car also is equipped with a cruise control system according to the present invention.

Optionally, the servo-control according the present invention can be modified by incorporating correction calculation in which increase of an effective radius of the tire due to centrifuge or decrease thereof due to loadage so as to compensate accumulation of drift caused by analog disturbance such as changes in contacting condition between tire and road.

The cruise control system according to the present invention possesses a dynamic range suitable to stabilize the distance to the preceding car. For example, in the case of the one-second gate counter, the number of "W" is about 566 at a car velocity of 100 km/hr. Since the quantization noise is half, the car runs about 17 km before the distance to the preceding car deviates by 15 m from a set value (the value of 15 m corresponds 10% of 150 m which is considered to be a safe distance between successive two cars). In other words, no frequented adjustment or correction is required so that the driver can enjoy driving without any feeling of disorder or inconvenience. Theoretically, the car can run more than 1,000 km without further adjustment or correction if 24 bits are used in the registers 39 (T) and 42 (S). This mileage exceeds a distance for which usual car can run without refueling.

Figure 4:
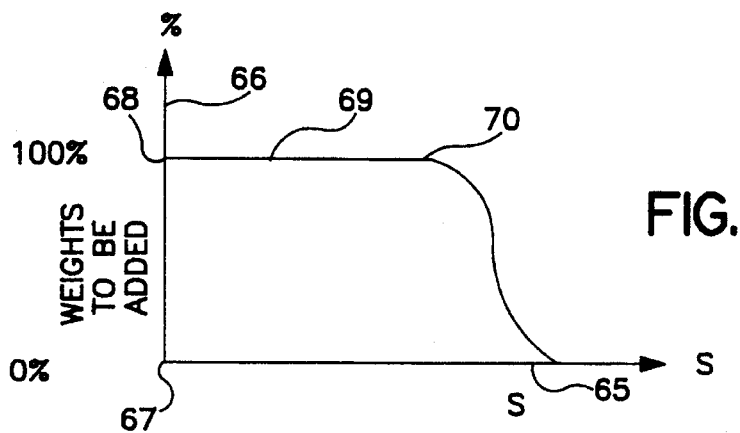
FIG. 4 illustrates and example of a membership function used in the cruise control system according to the present invention.

The system shown in FIG. 2 diverges if the driver frequently repeats adjustments or correction within a short time or without waiting a suitable time duration. In another embodiment, in order to solve this problem, when the main cruise control dial 19 is actuated, the values of "T" and "S" just before the main cruise control dial 19 is actuated are memorized as "Tp" and "Sp". Then, when the driver actuates the main cruise control dial 19, in other words re-adjustment or re-correction is effected by the driver, suitable weights are added to the values of "Tp" and "Sp" to calculate a new coefficient "Ka". FIG. 4 is an example of a function 69 showing how to add such weights to the value "S". In FIG. 4, an abscissa 65 represents the value "S" in the integration register 42 at a time when re-adjustment or re-correction is ordered and an ordinate 66 represents weights to be added to a previous value (0% at 67 and 100% at 68). The abscissa 65 may represent the time duration "T". In this example, in a range from 0 to a point 70 on the abscissa 65, the re-adjustment or re-correction made by the driver is judged to be "premature re-adjustment" so that the values of "Tp" and "Sp" (100% weight) are added to current values of "T" and "S". The function of FIG. 4 may be replaced by other functions such as a quadratic function. In order to provide a case where the "premature re-adjustment" is effected just after the initial setting of "Ka", the computer may memorize, as the "Tp" and "Sp", suitable values which are related to the initial value "Ka" and/or changing or deviation (%) of the value of "Ka" with respect to the value of "Kb" may be limited within a limited range. If necessary, the value "Ka" is converted to an analogu number which may be used as a velocity value for protecting against troubles or accidental acceleration. A speed limiter also may be incorporated in the system.

The cruise control system may inconvenience expert drivers in some aspects. In fact, expert drivers may feel unsatisfaction in the cruise control system according to the present invention in which two freedoms of controllable objects of velocity and distance to the preceding car are controlled by a single control parameter. For the able or expert drivers, the following optional dials or buttons may be useful:

(1) a proportional adjusting dial 21 for controlling only the car velocity so that the car velocity is adjusted independently. The output of the dial 21 can be added to or subtracted from the values of "Ka" and "Kb" in the registers 38, 47.

(2) a proportional adjusting dial 20 for controlling only the distance to the preceding car. This dial 20 is useful in the case where the distance to the preceding car is deviated from the fixed value due to disturbance caused by ones own car. The output of the dial 20 can be added to or subtracted from the adder-subtracter 43. In a variation, the dial 20 is combined with the dial 19 so that both distance and velocity are controlled by a single dial 19 in such a manner that the distance alone is controlled when the dial 19 is turned slowly while the velocity also is controlled when the dial 19 is turned faster. If necessary, any known control technique including two-dimensional control in which a velocity and a angle of revolution of the dial are combined, multi-dimensional fuzzy logic control theory in which a distance value obtained in the previous adjustment, the time duration and the other factors are combined or a look-up table can be used.

Figure 5:
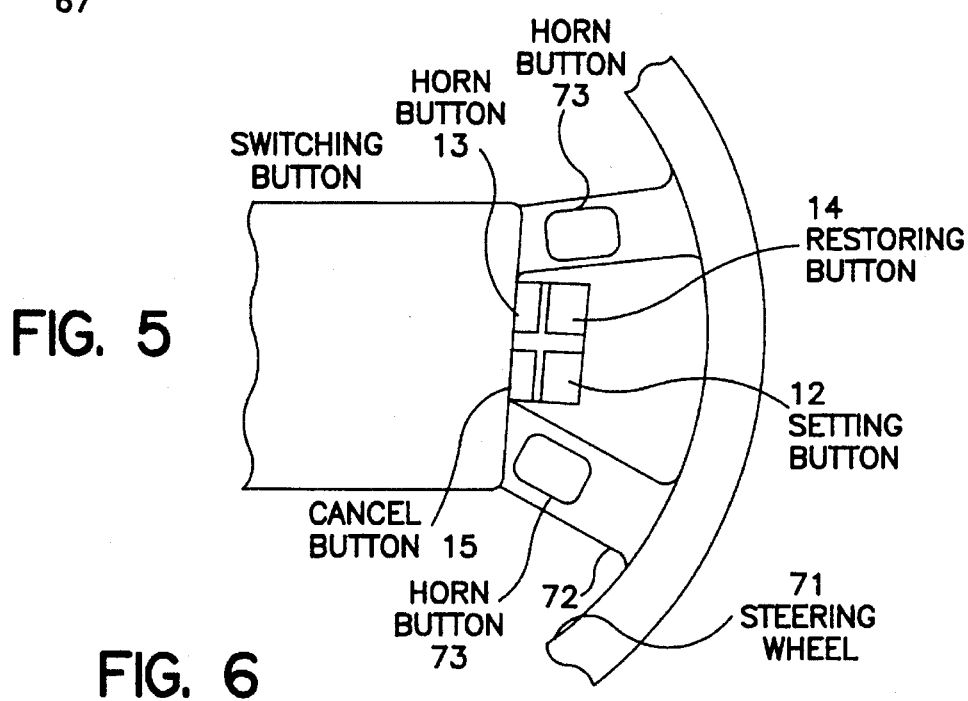
FIG. 5 is an illustrative front side view of a steering wheel equipped with several dials and buttons used in the cruise control system according to the present invention.
Figure 6:
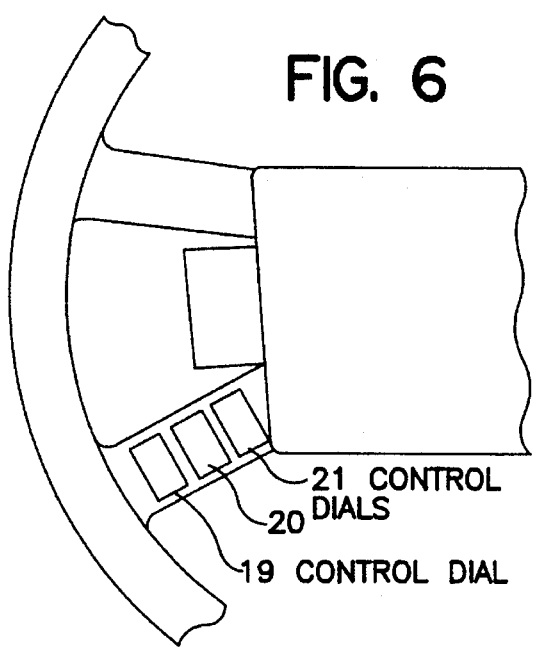
FIG. 6 is an illustrative rear side view of the steering wheel shown in FIG. 5.

FIG. 5 and FIG. 6 illustrate an example of a steering wheel equipped with several dials used in the cruise control system according to the present invention. In the FIG. 5 which is a front side view of the steering wheel viewed from the driver's seat, 71 is a steering wheel, 72 is a spoke, 73 is a horn button and 12, 13, and 14 are buttons shown in FIG. 1. In the FIG. 6 which is a rear side view of the steering wheel, 19, 20 and 21 are dials for adjusting a combination of distance plus velocity, velocity only and distance only respectively shown in the FIG. 1. Each dial 19, 20, 21 can be a knurled cylindrical dial whose axis is in parallel with the spoke 72.

Figure 7:
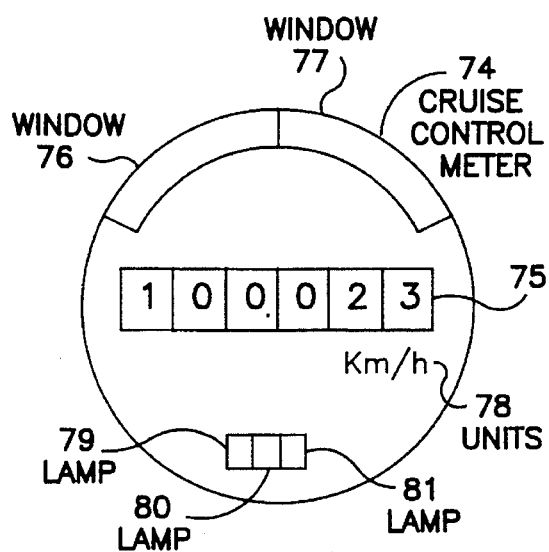
FIG. 7 illustrates an example of a meter used in the cruse control system of the present invention.

FIG. 7 illustrates an example of a cruise control meter 74 used in the present invention and is combined with usual speed meter. A velocity set by the pacemaker 100 is indicated in a window 75 in high precision (units are marked at 78). The number of remaining pulses is displayed analogically on two windows 76, 77. Left window 76 indicates a delay in distance comparing to the pacemaker, while the right window 77 indicates advance. In a variation, the deviation of velocity can be displayed coaxially with the windows 76, 77 or the velocity only can be displayed. If required, the driver can cruise a car by combining the velocity dial 21 with a velocity meter without using dials 19 and 20. Lamps 79, 78 and 79 are not used in the cruise control system according to the present invention.

The cruise control system according to the present invention can be said as "a man-machine communication system" in which a machine and a driver shear the cruising operation and do their best at each strong field and in which a machine provides much more reasonable driving technique than manual operation.

The present invention provides an easily operable simple, realistic cruise control system which is acceptable by any driver without feeling of disorder or inconvenience and which improves economy of fuel.

Modifications of the invention herein disclosed will occur to a person skilled in the art and all such modifications are deemed to be within the scope of this invention as defined by the appended claims.

I claim:

1. A cruise control system for keeping a car at a substantially constant distance from a preceding motorcar by a position servo unit which controls a fuel supply means of said car, comprising a pacemaker for producing command pulses to said position servo unit, a means for supplying distance pulses which are proportional to mileage of the car, as feedback pulses, to said position servo unit, an initial value setting means for setting an initial pulse rate for said pacemaker at an instance when a driver judges that a stable constant distance to the preceding motorcar is attained, and a control means for modifying remaining pulses of said pacemaker directly or indirectly at another instance when the driver judges that the distance to the preceding motorcar deviates from said stable constant distance set in a previous operation, said control means for modifying remaining pulses including a reversible cruise control dial arranged interiorly of said car within a driver's reach for adding an additional pace value to said remaining pulses directly or indirectly when said reversible cruise control dial is operated, said remaining pulses being modified directly by adding distance pulses which are proportional to a correction value or indirectly by changing a pulse rate in said pacemaker.

2. The cruise control system set forth in claim 1, wherein said remaining pulses represent a difference between an imaginary pace value which is proportional to the car velocity at an instance when the driver judges that a stable constant distance to the preceding motorcar is attained and an actual pace value produced in said pacemaker.

3. The cruise control system set forth in claim 1, wherein said control means for modifying said remaining pulses comprise, as one of a plurality of operation parameters, a function of past cruising data.

4. The cruise control system set forth in claim 3, wherein said function of past cruising data is a weighting function.

5. The cruise control system set forth in claim 1, wherein said means for supplying distance pulses is a pulser whose output pulses are proportional to the velocity of the car.

6. The cruise control system set forth in claim 1, wherein said position servo unit is a proportional - integral - derivative (P.I.D.) controller.

* * * * *